United States Patent
Saigusa

(10) Patent No.: US 10,837,126 B2
(45) Date of Patent: Nov. 17, 2020

(54) VINYLIDENE FLUORIDE RESIN FIBERS AND SHEET-LIKE STRUCTURE

(71) Applicant: Kureha Corporation, Tokyo (JP)

(72) Inventor: Kotaku Saigusa, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/331,752

(22) PCT Filed: Aug. 30, 2017

(86) PCT No.: PCT/JP2017/031121
§ 371 (c)(1),
(2) Date: Mar. 8, 2019

(87) PCT Pub. No.: WO2018/051788
PCT Pub. Date: Mar. 22, 2018

(65) Prior Publication Data
US 2019/0284725 A1   Sep. 19, 2019

(30) Foreign Application Priority Data

Sep. 14, 2016 (JP) .................. 2016-179948

(51) Int. Cl.
*D01F 6/12* (2006.01)
*C08F 14/22* (2006.01)
*D01D 5/12* (2006.01)

(52) U.S. Cl.
CPC ............. *D01F 6/12* (2013.01); *C08F 14/22* (2013.01); *D01D 5/12* (2013.01)

(58) Field of Classification Search
CPC ...... C08F 14/22; C08F 114/22; C08F 214/22; C08J 2327/16; C08J 2427/16; C08L 27/16; B29K 2027/16; B29K 2227/16; B32B 2262/0238; B32B 27/304; D01F 6/12; D06N 2201/0236; D01D 5/12
See application file for complete search history.

(56) References Cited

U.S. PATENT DOCUMENTS

| | | | |
|---|---|---|---|
| 3,707,592 A | 12/1972 | Ishii et al. | |
| 3,925,339 A * | 12/1975 | Ishii ................ | C08F 14/22 526/255 |
| 4,521,483 A * | 6/1985 | Sasaki ............... | D01F 8/10 264/172.15 |
| 4,546,158 A * | 10/1985 | Mizuno ............. | D01F 6/12 428/364 |
| 4,667,001 A | 5/1987 | Mizuno | |
| 4,670,527 A | 6/1987 | Mizuno | |
| 2007/0009734 A1 | 1/2007 | Hashimoto et al. | |
| 2009/0295038 A1 | 12/2009 | Hashimoto et al. | |
| 2016/0244910 A1 | 8/2016 | Chauveau et al. | |

FOREIGN PATENT DOCUMENTS

| | | |
|---|---|---|
| CN | 1860263 A | 11/2006 |
| CN | 105593433 A | 5/2016 |
| GB | 2095166 B | 6/1984 |
| JP | S57143511 A | 9/1982 |
| JP | S5941310 A | 3/1984 |
| JP | S6028510 A | 2/1985 |
| JP | S6141318 A | 2/1986 |
| JP | S61225310 A | 10/1986 |
| JP | 2013-55910 A | 3/2013 |
| WO | WO2016147713 A1 | 9/2016 |

OTHER PUBLICATIONS

First Office Action issued by China National Intellectual Property Administration for CN201780045700.4/PCT/JP2017/031121 dated Jun. 26, 2019.
Extended Search Report issued by China National Intellectual Property Administration for CN201780045700.4/PCT/JP2017/031121 dated Jun. 18, 2019.
International Search Report for PCT/JP2017/031121 dated Nov. 7, 2017.
Translation of the International Search Report for PCT/JP2017/031121 dated Nov. 7, 2017.
Written Opinion of the International Preliminary Examining Authority for PCT/JP2017/031121(WO/IPEA) dated Aug. 14, 2018.
Translation of the Written Opinion of the International Preliminary Examining Authority for PCT/JP2017/031121(WO/IPEA) dated Aug. 14, 2018.
Translation of the Written Opinion of the International Search Authority for PCT/JP2017/031121(WO/IPEA) dated Nov. 7, 2017.
Translation of the International Preliminary Report on Patentability (Chapter II) for PCT/JP2017/031121 dated Mar. 14, 2019.
First Office Action for JP2018-539614 dated Jan. 15, 2019.
Translation of First Office Action for JP2018-539614 dated Jan. 15, 2019.
Extended European Search Report dated Aug. 30, 2019, for European Application No. 17850691.1.
Magniez et al., "Effect of Drawing on the Molecular Orientation and Polymorphism of Melt-Spun Polyvinylidene Fluoride Fibers: Toward the Development of Piezoelectric Force Sensors", Journal of Applied Polymer Science, vol. 129, No. 5, Jan. 30, 2013, pp. 2699-2706.
Chinese Office Action for Applicaiton No. 201780045700.4, dated Jun. 26, 2019, with English language translation.
Chinese Office Action and Search Report dated Aug. 15, 2019, in Chinese Patent Application No. 201780045740.9.

(Continued)

*Primary Examiner* — Laura C Powers
*Assistant Examiner* — Larissa Rowe Emrich
(74) *Attorney, Agent, or Firm* — Birch, Stewart, Kolasch & Birch, LLP

(57) ABSTRACT

Provided are fibers that have excellent mechanical properties such as strength and that do not result in the filament breakage during a manufacturing process. The fibers are vinylidene fluoride resin fibers including a plurality of vinylidene fluoride resin filaments, and having a degree of crystal orientation of 80% or more as determined on the basis of X-ray diffraction from the azimuth angle intensity distribution curve of $2\theta=20.8\pm1°$, and a crystal size of 12 nm or less.

12 Claims, No Drawings

(56) References Cited

OTHER PUBLICATIONS

Chinese Office Action and Search Report dated Feb. 3, 2020, in Chinese Patent Application No. 201780045740.9.
Extended European Search Report, dated Aug. 30, 2019, for European Application No. 17850690.3.
International Search Report dated Nov. 7, 2017, for International Application No. PCT/JP2017/031120, with English translation.
Japanese Office Action dated Jan. 15, 2019, for Japanese Application No. 2018-539613, with English translation.
Lund et al., "Melt Spinning of β-Phase Poly(vinylidene fluoride) Yarns With and Without a Conductive Core," Jounal of Applied Polymer Science, vol. 120, No. 2, 2002, (Published online Nov. 8, 2010), pp. 1080-1089, XP007916596.
U.S. Office Action dated Apr. 27, 2020, for U.S. Appl. No. 16/331,779.
U.S. Office Action dated Jun. 12, 2019, for U.S. Appl. No. 16/331,779.
U.S. Office Action dated Sep. 26, 2019, for U.S. Appl. No. 16/331,779.
Written Opinion of the International Preliminary Examining Authority dated Aug. 14, 2018, for International Application No. PCT/JP2017/031120, with English translation.
Written Opinion of the International Searching Authority dated Nov. 7, 2017, for International Application No. PCT/JP2017/031120.
Translation of the International Preliminary Report on Patentability (Chapter II) for PCT/JP2017/031120 dated Mar. 14, 2019.
Chinese Office Action dated May 8, 2020, for Chinese Patent Application No. 201780045740.9, with an English translation.
U.S. Office Action for U.S. Appl. No. 16/331,779, dated Aug. 3, 2020.
European Office Action for Application No. 17850690.3, dated Jul. 23, 2020.
European Office Action for Application No. 17850691.1, dated Jul. 23, 2020.
Namatame, Yukiko, "Evaluation of crystalline polymer material using 2D-SAXS/WAX system", Rigaku Journal, vol. 49, No. 2, p. 14, 2018, with partial English translation.
Chinese Office Action for Application No. 201780045740.9, dated Sep. 7, 2020 with English language translation.

* cited by examiner

VINYLIDENE FLUORIDE RESIN FIBERS AND SHEET-LIKE STRUCTURE

TECHNICAL FIELD

The present invention relates to vinylidene fluoride resin fibers and a sheet-like structure.

BACKGROUND ART

Due to vinylidene fluoride resins having excellent mechanical properties, their development is progressing to enable expanded applications into a variety of fields.

For example, Patent Document 1 discloses vinylidene fluoride resin molded product having a high Young's modulus and excellent surface characteristics and transparency.

Patent Document 2 discloses a vinylidene fluoride resin with improved tensile strength and a method for manufacturing the vinylidene fluoride resin.

Patent Document 2 also discloses that spinning vinylidene fluoride resin with a high draft ratio can provides a filament having a high birefringence, a large crystal size in the molecular chain direction, and excellent mechanical properties.

CITATION LIST

Patent Literature

Patent Document 1: JP S59-41310 A (published Mar. 7, 1984)

Patent Document 2: JP 560-28510 A (published Feb. 13, 1985)

SUMMARY OF INVENTION

Technical Problem

However, the filament obtained by the method of Patent Document 2 is manufactured by a unique spinning method that does not require a drawing process until it is wound as a filament from the spinneret. For this reason, melting conditions and cooling conditions need to be closely managed. Furthermore, there is the problem that the range of management thereof is extremely narrow and the filament breakage often occurred. Additionally, as physical properties, the obtained filament demonstrates high mechanical strength but low elongation at break. For this reason, the expansion of applications of fibers constituted of such filaments is limited.

The present invention takes the above problems into consideration, and an object of the present invention is to provide a fiber that does not need close management in the manufacturing process and is can be applied in numerous applications.

Solution to Problem

The present inventors discovered that controlling the crystal structure of a fiber obtained using a plurality of vinylidene fluoride resin filaments provides a fiber that has excellent mechanical characteristics and does not result in the filaments breakage in the manufacturing process, and thereby achieved the present invention.

To solve the above problem, the vinylidene fluoride resin fiber according to the present invention is a fiber including a plurality of vinylidene fluoride resin filaments, wherein the fiber has a degree of crystal orientation of not less than 80% and a crystal size of not greater than 12 nm on the basis of X-ray diffraction from the azimuth angle intensity distribution curve of $2\theta=20.8\pm1°$.

The sheet-like structure according to the present invention is obtained using the vinylidene fluoride resin fiber of the present invention.

Advantageous Effects of Invention

The present invention can provide a fiber that does not need close management in the manufacturing process and can be applied in numerous applications.

DESCRIPTION OF EMBODIMENTS

An embodiment of the vinylidene fluoride resin fiber according to the present invention will be specifically described below.

Vinylidene Fluoride Resin Fiber

The vinylidene fluoride resin fiber according to the present embodiment (also simply called "fiber" hereinafter) is a fiber including a plurality of vinylidene fluoride resin filaments, wherein the fiber has a degree of crystal orientation of not less than 80% and a crystal size of not greater than 12 nm as determined on the basis of X-ray diffraction from the azimuth angle intensity distribution curve of $2\theta=20.8\pm1°$.

Filament

In the present embodiment, a filament signifies one single thread. The vinylidene fluoride resin filament according to the present embodiment (also simply called "filament" hereinafter) signifies a filament made from a vinylidene fluoride resin. Note that the vinylidene fluoride resin will be described in detail later.

The length of the filament according to the present embodiment may be determined as appropriate in accordance with the length of the fiber.

The diameter of the filament according to the present embodiment may be determined as appropriate according to the application of the fiber and the like. The diameter of the filament is preferably from 5 µm to 80 µm, more preferably from 10 µm to 60 µm, and even more preferably from 12 µm to 40 µm.

Note that in the present specification, the length of the filament indicates the size of the filament in the longitudinal direction. Furthermore, the diameter of the filament indicates the size of the filament in the direction perpendicular to the longitudinal direction.

Fiber

The fiber according to the present embodiment signifies a fiber structure including a plurality of vinylidene fluoride resin filaments. The fiber of the present embodiment is obtained by unifying a plurality of filaments, and generally signifies a format called multifilament.

The number of filaments according to the present embodiment may be determined as appropriate according to the application of the fiber and the like, and is not particularly specified.

The length of the fiber according to the present embodiment may be determined as appropriate according to the application of the fiber and the like.

Degree of Crystal Orientation

In the present specification, the degree of crystal orientation signifies the degree of crystal orientation as determined on the basis of X-ray diffraction from the azimuth angle intensity distribution curve of 2θ=20.8±1°. The degree of crystal orientation may be determined based on Equation (1) below.

[Equation 1]

$$\text{Degree of crystal orientation}(f) = \frac{360 - \sum \beta}{360} \times 100 \quad (1)$$

(In the equation, β indicates the full-width at half maximum of the intensity peak in the azimuth angle intensity distribution curve.)

The degree of crystal orientation as determined on the basis of X-ray diffraction from the azimuth angle intensity distribution curve of 2θ=20.8±1° in the fiber according to the present embodiment is not less than 80%, preferably not less than 90%, and more preferably not less than 95%. The degree of crystal orientation is preferably in this range from the perspective that the mechanical strength of the filament and the fiber improves.

Note that in the present embodiment, the above degree of crystal orientation does not change depending on the number of filaments in the fiber according to the present embodiment.

Crystalline Structure

The crystalline structure of the fiber according to the present embodiment is mainly β-phase, but may be an α-β mixture which includes α-phase in addition to β-phase, depending on the fiber manufacturing conditions to be described later. In a case where the crystalline structure is an α-β mixture, the ratio of α-phase to β-phase is not particularly limited. Note that the crystalline structure of the fiber according to the present embodiment does not include γ-phase.

Melting Point

The fiber according to the present embodiment preferably has two or more melting peaks in the range of 150° C. to 180° C. The melting peak is measured by a differential scanning calorimeter (DSC). In the present embodiment, a melting peak of less than 170° C. is defined as Tm1 and a melting peak of not lower than 170° C. is defined as Tm2. Tm1 is preferably within the range of 150° C. to 169.9° C., and preferably within the range of 160° C. to 168° C. Tm2 is preferably within the range of 170° C. to 180° C., and preferably in the range of 170.5° C. to 178° C.

Note that the DSC melting peak may be determined by increasing the temperature of the fiber at a rate of 10° C./minute in the temperature range of 25° C. to 230° C.

In particular, the melting peak of Tm1 that appears within the range of 160° C. to 168° C. corresponds to the fact that the crystalline structure of the fiber undergoes a phase transition from the β-phase to the α-phase due to melting. Therefore, when Tm1 is in the range of 160° C. to 168° C., the crystal orientation of the fiber proceeds through the drawing process to be described later, resulting in the crystalline structure of the fiber being β-phase. Thus, Tm1 within the range above is preferable from the perspective that the mechanical strength of the fiber increases. Note that the fiber according to the present embodiment is considered not to include γ-phase further based on the fact that a melting peak does not appear near 190° C.

Crystal Size

In the present specification, crystal size may be determined by the Scherrer equation shown in Equation (2) below.

[Equation 2]

$$\text{Crystal size}(D) = \frac{k\lambda}{\beta \cos\theta} \quad (2)$$

(In the equation, D indicates the crystal size, k indicates a constant (0.9), λ indicates the wavelength of X-rays (Cu-Kα) (0.1542 nm (1.54 Å)), and β indicates the full-width at half maximum)

According to the present embodiment, use of a vinylidene fluoride resin fiber having the degree of crystal orientation and the crystal size described above can provide a fiber that has excellent mechanical characteristics and that does not result in the filament breakage in the manufacturing process.

Birefringence

In the present embodiment, the birefringence may be measured using a generally used compensator. Specifically, it may be measured by, for example, the method described in the examples to be described later.

The birefringence of the fiber according to the present embodiment is preferably not less than $30 \times 10^{-3}$, more preferably not less than $40 \times 10^{-3}$, and even more preferably not less than $45 \times 10^{-3}$. The birefringence is preferably in this range from the perspective that the mechanical strength of the fiber improves.

Tensile Strength

In the present embodiment, the tensile strength may be measured using a generally used tensile tester. Specifically, it may be measured by, for example, the method described in the examples to be described later.

The tensile strength of the fiber according to the present embodiment is preferably not less than 2.0 cN/dtex, more preferably not less than 3.1 cN/dtex, and even more preferably not less than 3.5 cN/dtex.

Elongation at Break

In the present embodiment, the elongation at break may be measured using a generally used tensile tester. Specifically, it may be measured by, for example, the method described in the examples to be described later.

The elongation at break of the fiber according to the present embodiment is preferably not greater than 50%, more preferably not greater than 40%, and even more preferably not greater than 30%.

Vinylidene Fluoride Resin

In the present specification, vinylidene fluoride resin signifies a polymer containing a vinylidene fluoride (also called "VDF" hereinafter) monomer as the main component. The vinylidene fluoride resin in the present invention may be a vinylidene fluoride copolymer of a vinylidene fluoride monomer and another monomer, or may be a vinylidene fluoride homopolymer constituted of only one type of vinylidene fluoride monomer.

The other monomer according to the present embodiment is preferably at least one type selected from the group consisting of hexafluoropropylene, trifluoroethylene, tetrafluoroethylene, and chlorotrifluoroethylene.

The vinylidene fluoride copolymer according to the present embodiment contains preferably not less than 90 mol % and more preferably not less than 97 mol % of a vinylidene fluoride monomer, and is most preferably a vinylidene fluoride homopolymer. The content of vinylidene fluoride monomer is preferably in this range from the perspective that the mechanical strength of the fiber is enhanced.

Inherent Viscosity

In the present embodiment, the inherent viscosity may be determined by dissolving a sample in dimethylformamide as a solvent and measuring the time for which a certain volume of the liquid naturally drops in a capillary tube at 30° C. by using an Ubbelohde viscometer.

In the present embodiment, the inherent viscosity of the vinylidene fluoride resin is preferably from 0.70 dL/g to 0.95 dL/g, and more preferably from 0.75 dL/g to 0.90 dL/g. The inherent viscosity is preferably in this range from the perspective of manifestation of spinnability and mechanical strength.

Method of Manufacturing Vinylidene Fluoride Resin Fiber

An embodiment of the method of manufacturing the fiber according to the present embodiment (also called "the present manufacturing method" hereinafter) will be specifically described below, but the present manufacturing method is not limited to the method below.

The present manufacturing method is a method of producing a fiber by producing a plurality of filaments made from a vinylidene fluoride resin and unifying the filaments. The method includes an extrusion and discharge process, a spinning process, and a drawing process.

The vinylidene fluoride resin used in the present manufacturing method may be any vinylidene fluoride copolymers and vinylidene fluoride homopolymers. These vinylidene fluoride copolymers and vinylidene fluoride homopolymers may be manufactured by well-known polymerization methods and equipment. Furthermore, commercially available products may be used as the vinylidene fluoride copolymers and vinylidene fluoride homopolymers.

In the extrusion and discharge process, melted vinylidene fluoride resin is discharged in fiber form through the spinneret nozzle, and an un-drawn fiber of vinylidene fluoride resin is obtained. At that time, the vinylidene fluoride resin may be melted at, for example, from 240° C. to 270° C. The hole diameter of the spinneret nozzle may be adjusted as appropriate depending on the inherent viscosity and the like of the vinylidene fluoride resin to be discharged, and may be, for example, from 0.10 to 1.00 mm.

From the perspective of assuring sufficient spinnability of the vinylidene fluoride resin, the vinylidene fluoride resin is preferably discharged while maintaining the temperature of the vinylidene fluoride resin at 70 to 155° C. in the discharge process. Maintaining the temperature of the vinylidene fluoride resin in this manner may be performed for a certain time using, for example, a heating chamber directly below the spinneret nozzle.

Additionally, the un-drawn fiber of vinylidene fluoride resin is preferably solidified by cooling the discharged vinylidene fluoride resin. Such a process allows efficient drawing in the subsequent drawing process. Note that the method for cooling the vinylidene fluoride resin is not particularly limited, but air cooling is preferred from the perspective of convenience.

In the spinning process, the melted matter discharged in the discharge process is spun at a prescribed draft ratio. This can provide an un-drawn fiber of vinylidene fluoride resin having low orientation. The draft ratio in the spinning process is preferably low, for example, from 20 to 300.

Then, the obtained vinylidene fluoride resin filaments are unified into a single body by, for example, bundling the filaments with an oil ring or the like. Then, in the drawing process, the unified vinylidene fluoride resin filaments are drawn. Thus, the fiber according to the present embodiment is obtained.

In the drawing process, the drawing temperature of the unified vinylidene fluoride resin filaments is, for example, from 70 to 165° C., preferably from 80 to 160° C., and more preferably from 100 to 155° C. The draw ratio is, for example, from 2.50 to 6.00 times, preferably from 3.00 to 5.80 times, and more preferably from 3.40 to 5.60 times.

After the drawing process, a relaxation or heat treatment may be performed on the fiber. Thermal shrinkage of the fiber can be prevented by performing these treatments. Furthermore, these treatments increase the degree of crystallization of the fiber and cause the amorphous region to be rigid, and thereby enhance the strength of the fiber. The relaxation temperature in the relaxation treatment is, for example, from 100 to 180° C., preferably from 110 to 170° C., and more preferably from 120 to 165° C. The relaxation ratio is, for example, from 0 to 20%, preferably from 0 to 17%, and more preferably from 0 to 15%. The temperature in heat treatment is, for example, from 100 to 180° C., preferably from 110 to 170° C., and more preferably from 120 to 165° C.

According to the present manufacturing method, the drawing temperature in the drawing process is from 80 to 155° C. and the draw ratio is from 3.00 to 5.50. Drawing under such conditions promotes crystal orientation of the fiber, and causes the crystalline structure of the fiber to be β-phase. Therefore, the mechanical strength of the fiber can be further improved.

Due to the degree of crystal orientation of the fiber being not less than 80% and the crystal size being not greater than 12 nm as determined on the basis of X-ray diffraction from the azimuth angle intensity distribution curve of $2\theta=20.8\pm1°$, a fiber having tensile strength of not less than 2.0 cN/dtex and elongation at break of not greater than 50% can be obtained.

Additionally, a fiber having a birefringence of not less than $40\times10^{-3}$, a tensile strength of not less than 3.1 cN/dtex, and an elongation at break of not greater than 40% can be obtained due to either of the two following conditions being satisfied:

(i) the degree of crystal orientation of the fiber is not less than 90% as determined on the basis of X-ray diffraction from the azimuth angle intensity distribution curve of $2\theta=20.8\pm1°$, or (ii) one melting peak determined by DSC is present in each of two ranges, namely the range of 160° C. to 168° C. and the range of 170° C. to 180° C.

Such a fiber is advantageously used for the sheet-like structure to be described later, for example.

Applications of Vinylidene Fluoride Resin Fiber

The vinylidene fluoride resin fiber according to the present embodiment may undergo treatments such as antistatic, flame-retardancy, flame-proofing, anti-bacterial, deodorization, and odor-resistance treatments or various surface processing treatments as necessary.

Furthermore, the sheet-like structure made from fiber according to the present embodiment may be produced by carrying out a process such as weaving or knitting using the vinylidene fluoride resin fiber according to the present embodiment. In this case, the process such as weaving or knitting may be carried out using well-known methods and equipment.

The sheet-like structure according to the present embodiment may also be a laminate including a plurality of sheet-like structures.

The sheet-like structure according to the present embodiment may be formed in a mesh form. In the sheet-like structure according to the present embodiment, the entire sheet may be formed in a mesh form or a portion of the sheet may be formed in a mesh form.

The format of the sheet-like structure according to the present embodiment is not particularly limited. For example, it may be used in various formats such as woven fabrics, knits, strings, cut fibers, papers, and nonwoven fabrics. The applications of the sheet-like structure are also not particularly limited. For example, it may be advantageously used in various industrial materials such as reinforced fibers for hollow fiber membranes, ropes and clothes, in base materials for medical use, in colored fibers, and in sensor devices as a piezoelectric substance. In a case where the sheet-like structure according to the present embodiment is formed in a mesh form, it may be advantageously used as, for example, a fishing net.

Summary

As described above, one aspect of the vinylidene fluoride resin fiber according to the present invention is a fiber including a plurality of vinylidene fluoride resin filaments, wherein the fiber has a degree of crystal orientation of not less than 80% and a crystal size of not greater than 12 nm as determined on the basis of X-ray diffraction from the azimuth angle intensity distribution curve of $2\theta=20.8\pm1°$.

In one aspect of the vinylidene fluoride resin fiber according to the present invention, the vinylidene fluoride resin preferably has two or more melting peaks in the range of 150° C. to 180° C.

In one aspect of the vinylidene fluoride resin fiber according to the present invention, the diameter of the filament is preferably not less than 5 μm and less than 80 μm.

In one aspect of the vinylidene fluoride resin fiber according to the present invention, the birefringence is preferably not less than $30\times10^{-3}$.

In one aspect of the vinylidene fluoride resin fiber according to the present invention, the vinylidene fluoride resin is preferably a homopolymer of a vinylidene fluoride monomer.

In one aspect of the vinylidene fluoride resin fiber according to the present invention, the vinylidene fluoride resin may be a vinylidene fluoride copolymer of a vinylidene fluoride monomer and another monomer, and the other monomer is at least one type selected from the group consisting of hexafluoropropylene, trifluoroethylene, tetrafluoroethylene, and chlorotrifluoroethylene.

In one aspect of the vinylidene fluoride resin fiber according to the present invention, the vinylidene fluoride copolymer preferably contains not less than 90 mol % of a vinylidene fluoride monomer.

In one aspect of the vinylidene fluoride resin fiber according to the present invention, the inherent viscosity of the vinylidene fluoride resin is preferably from 0.70 dL/g to 0.95 dL/g.

In one aspect of the vinylidene fluoride resin fiber according to the present invention, preferably, the tensile strength is not less than 2.0 cN/dtex and the elongation at break is not greater than 50%.

In one aspect of the vinylidene fluoride resin fiber according to the present invention, more preferably, the birefringence is not less than $40\times10^{-3}$, the tensile strength is not less than 3.1 cN/dtex, and the elongation at break is not greater than 40%.

One aspect of the sheet-like structure according to the present invention includes the vinylidene fluoride resin fiber of the present invention.

In one aspect of the sheet-like structure according to the present invention, the structure may be formed in a mesh form.

The present invention is not limited to the embodiments described above, and various modifications are possible within the scope indicated in the claims. Embodiments obtained by appropriately combining the technical means disclosed by other embodiments are also included in the technical scope of the present invention.

EXAMPLES

The vinylidene fluoride resin fibers in the following examples and comparative examples were all manufactured using a spinning apparatus (available from Fiber Extrusion Technology Ltd.).

Example 1

The vinylidene fluoride resin used was pellet-formed polyvinylidene fluoride (called "PVDF" hereinafter; KF polymer available from Kureha Corporation; melting point 173° C.; inherent viscosity 0.85 dL/g).

From the hopper of the spinning apparatus, the PVDF pellets were charged into a single screw extruder (cylinder diameter φ 25 mm), and the PVDF pellets were melted by heating at 265 to 270° C. The melted PVDF was spun at a draft ratio of 120 from a 24-hole nozzle (hole diameter 0.40 mm) using a gear pump, to produce 24 filaments made from PVDF, which were then coated with an oiling agent to produce a fiber made from PVDF. Then at in-line drawing process, the fiber was drawn at a drawing temperature of 80° C. with a draw ratio of 4.50, and then the PVDF was heat treatment at a relaxation temperature of 130° C. at a relaxation ratio of 0% to produce a drawn fiber made from PVDF.

Example 2

A fiber was obtained in the same method as Example 1 except that the drawing temperature was 130° C. and the draw ratio was 4.25.

Example 3

A fiber was obtained in the same method as Example 1 except that the drawing temperature was 130° C. and the draw ratio was 3.50.

Example 4

A fiber was obtained in the same method as Example 1 except that the drawing temperature was 130° C. and the draw ratio was 3.00.

Example 5

A fiber was obtained in the same method as Example 1 except that the draft ratio was 60, the drawing temperature was 100° C., the draw ratio was 5.50, and the relaxation temperature was 100° C.

Example 6

A fiber was obtained in the same method as Example 1 except that the drawing temperature was 130° C., the draw ratio was 4.25, the relaxation temperature was 150° C., and the relaxation ratio was 10%.

Comparative Example 1

A fiber was obtained in the same method as Example 1 except that the inherent viscosity of the PVDF used in Example 1 was changed to 1.00 dL/g, the diameter of the nozzle in Example 1 was changed to 2 mm, and the draft ratio was changed to 2550.

Comparative Example 2

A fiber was obtained by subjecting the fiber obtained in Comparative Example 1 to a non-in-line drawing process. Specifically, after the un-drawn fiber obtained in Comparative Example 1 was temporarily wound, the wound un-drawn fiber was drawn to 1.16 times at a drawing temperature of 144° C. in off-line drawing process.

Comparative Example 3

A fiber was obtained in the same method as Comparative Example 1 except that the draft ratio was changed to 10000.

Comparative Example 4

A fiber was obtained in the same method as Example 1 except that the inherent viscosity of the PVDF was changed to 0.68 dL/g and filaments made from PVDF were obtained with a nozzle diameter of 1 mm and a draft ratio of 850, and the fiber was not drawn in the subsequent process.

The manufacturing conditions in the above Examples 1 to 6 and Comparative Examples 1 to 4 are summarized in Table 1 below.

Evaluation of Vinylidene Fluoride Resin Fiber

The vinylidene fluoride resin fibers obtained in Examples 1 to 6 and Comparative Examples 1 to 4 were evaluated with regard to filament diameter, birefringence, degree of crystal orientation, crystal size, melting point (Tm1 and Tm2), tensile strength, and elongation at break. The results are shown in Table 1. The specific evaluation methods are described below.

Filament Diameter

A filament of un-drawn fiber of PVDF measuring 1 m long was measured at 20 points with a micrometer, and the average value was determined.

Birefringence

A fiber was sheared on the diagonal using a utility knife, and several drops of an immersion fluid (immersion oil: n=1.516 (23° C.)) were added dropwise onto the sheared surface of the fiber. The birefringence (Δn) was determined by measuring retardation using a polarizing microscope and a Berek compensator available from Olympus Corporation.

Degree of Crystal Orientation

X-rays were irradiated onto a sample using an X-ray generator (available from Rigaku Corporation), and the intensity profile was measured using an imaging plate (IP). The light source was irradiated for 30 minutes at tube voltage 40 kV and tube current 20 mA using Cu-Kα rays (0.1542). The intensity profile for the azimuth angle direction of 2θ=20.8±1° was measured, and the degree of crystal orientation was calculated from the full-width at half maximum β using the following equation.

[Equation 3]

$$\text{Degree of crystal orientation }(f) = \frac{360 - \sum \beta}{360} \times 100$$

Crystal Size

The intensity profile was fitted using peak separation software, and the crystal size was calculated using the Scherrer equation shown below.

[Equation 4]

$$\text{Crystal Size }(D) = \frac{k\lambda}{\beta \cos\theta}$$

(In the equation, D indicates the crystal size, k indicates a constant (0.9), λ indicates the wavelength of X-rays (Cu-Kα) (0.1542 nm (1.54 Å)), and β indicates the full-width at half maximum of the intensity peak in the azimuth angle intensity distribution curve.)

Melting Point (Tm)

5 mg of filaments were charged in an aluminum pan and the aluminum pan was sealed. The temperature was increased at a temperature increasing rate of 10° C./minute by using a differential scanning calorimeter (DSC-1 available from METTLER TOLEDO). The peak temperature of a peak appearing at lower than 170° C. was defined as Tm1, and that appearing at not lower than 170° C. was defined as Tm2.

Tensile Strength and Elongation at Break

Using a Tensilon tensile tester (available from Orientec Co., Ltd.), tensile strength and elongation at break were measured five times with a test sample length of 300 mm and a crosshead speed of 300 mm/minute. Note that tensile strength and elongation at break are the average of the values at fracture (maximum point).

TABLE 1-1

|  | Draft ratio (—) | Drawing temperature (° C.) | Draw ratio (times) | Relaxation temperature (° C.) | Relaxation ratio (%) |
|---|---|---|---|---|---|
| Example 1 | 120 | 80 | 4.50 | 130 | 0 |
| Example 2 | 120 | 130 | 4.25 | 130 | 0 |
| Example 3 | 120 | 130 | 3.50 | 130 | 0 |
| Example 4 | 120 | 130 | 3.00 | 130 | 0 |
| Example 5 | 60 | 100 | 5.50 | 100 | 0 |
| Example 6 | 120 | 130 | 4.25 | 150 | 10 |
| Comparative Example 1 | 2550 | — | — | — | — |
| Comparative Example 2 | 2550 | 144 | 1.16 | 144 | 1.00 |
| Comparative Example 3 | 10000 | — | — | — | — |
| Comparative example 4 | 850 | — | — | — | — |

TABLE 1-2

|  | Fiber diameter (μm) | Birefringence (×10⁻³) | Degree of crystal orientation (%) | Crystal size (nm) | Tm1 (° C.) | Tm2 (° C.) | Tensile strength (cN/dtex) | Elongation at break (%) |
| --- | --- | --- | --- | --- | --- | --- | --- | --- |
| Example 1 | 18.9 | 63.7 | 96.4 | 5.01 | 164.9 | 172.1 | 4.3 | 14 |
| Example 2 | 19.2 | 53.4 | 97.2 | 6.12 | 164.9 | 172.2 | 4.6 | 15 |
| Example 3 | 20.6 | 49.5 | 96.8 | 6.60 | 165.1 | 175.1 | 3.5 | 24 |
| Example 4 | 22.4 | 46.6 | 95.5 | 9.01 | — | 175.1 | 2.6 | 42 |
| Example 5 | 24.0 | 53.4 | 97.6 | 4.82 | 164.9 | 172.1 | 4.9 | 15 |
| Example 6 | 19.5 | 56.3 | 97.0 | 8.97 | 164.9 | 172.1 | 5.1 | 21 |
| Comparative Example 1 | 40.0 | 48.0 | 94.2 | 14.08 | — | 191.0 | 3.8 | 30 |
| Comparative Example 2 | 40.0 | 58.0 | 93.7 | 14.02 | — | 191.0 | 4.2 | 13 |
| Comparative Example 3 | 20.0 | 59.0 | 95.7 | 13.85 | — | 190.1 | 4.0 | 21 |
| Comparative example 4 | 28.7 | 32.8 | 86.4 | 12.13 | — | 170.1 | 1.7 | 153 |

INDUSTRIAL APPLICABILITY

The vinylidene fluoride resin fiber according to the present invention may be used in various formats such as woven fabrics, knits, strings, cut fibers, papers, and nonwoven fabrics, and in various industrial materials such as reinforced fibers for hollow fiber membranes, ropes and clothes, in base materials for medical use, in colored fibers, and in sensor devices as a piezoelectric substance.

The invention claimed is:

1. A vinylidene fluoride resin fiber comprising a plurality of vinylidene fluoride resin filaments, wherein
the fiber has a degree of crystal orientation of not less than 80% and a crystal size of not less than 5.01 nm and not greater than 12 nm as determined on the basis of X-ray diffraction from an azimuth angle intensity distribution curve of 2θ=20.8±1°;
the fiber is a mono-component; and
the vinylidene fluoride resin fiber is obtained by drawing the vinylidene fluoride resin filaments at a draw ratio of 3.40 to 6.00 times.

2. The vinylidene fluoride resin fiber according to claim 1, wherein the vinylidene fluoride resin has two or more melting peaks within a range of 150° C. to 180° C.

3. The vinylidene fluoride resin fiber according to claim 1, wherein a diameter of the filament is not less than 5 μm and less than 80 μm.

4. The vinylidene fluoride resin fiber according to claim 1, wherein a birefringence is not less than 30×10⁻³.

5. The vinylidene fluoride resin fiber according to claim 1, wherein the vinylidene fluoride resin is a homopolymer of a vinylidene fluoride monomer.

6. The vinylidene fluoride resin fiber according to claim 1, wherein
the vinylidene fluoride resin is a vinylidene fluoride copolymer of a vinylidene fluoride monomer and another monomer, and
the other monomer is at least one type selected from the group consisting of hexafluoropropylene, trifluoroethylene, tetrafluoroethylene, and chlorotrifluoroethylene.

7. The vinylidene fluoride resin fiber according to claim 6, wherein the vinylidene fluoride copolymer contains not less than 90 mol % of a vinylidene fluoride monomer.

8. The vinylidene fluoride resin fiber according to claim 1, wherein an inherent viscosity of the vinylidene fluoride resin is from 0.70 dL/g to 0.95 dL/g.

9. The vinylidene fluoride resin fiber according to claim 1, wherein a tensile strength is not less than 2.0 cN/dtex and an elongation at break is not greater than 50%.

10. The vinylidene fluoride resin fiber according to claim 1, wherein a birefringence is not less than 40×10⁻³, a tensile strength is not less than 3.1 cN/dtex, and an elongation at break is not greater than 40%.

11. A sheet-like structure comprising the vinylidene fluoride resin fiber described in claim 1.

12. The sheet-like structure according to claim 11, wherein the structure is formed in a mesh form.

* * * * *